United States Patent

Huang

(10) Patent No.: US 12,026,373 B2
(45) Date of Patent: Jul. 2, 2024

(54) SYSTEM AND METHOD TO CONTROL TEMPERATURE IN A MEMORY DEVICE

(71) Applicant: Acer Incorporated, New Taipei (TW)

(72) Inventor: Yi-Jhong Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/955,556

(22) Filed: Sep. 29, 2022

(65) Prior Publication Data

US 2023/0229310 A1    Jul. 20, 2023

(30) Foreign Application Priority Data

Jan. 19, 2022   (TW) .................................. 111102240

(51) Int. Cl.
*G06F 3/06*      (2006.01)

(52) U.S. Cl.
CPC ............ *G06F 3/061* (2013.01); *G06F 3/0629* (2013.01); *G06F 3/0659* (2013.01); *G06F 3/068* (2013.01)

(58) Field of Classification Search
CPC ...... G06F 3/061; G06F 3/0629; G06F 3/0659; G06F 3/068
USPC ........................................................ 711/154
See application file for complete search history.

(56) References Cited

U.S. PATENT DOCUMENTS

| | | | |
|---|---|---|---|
| 8,843,700 B1* | 9/2014 | Salessi .................. | G06F 3/0625 711/103 |
| 9,811,267 B1* | 11/2017 | Yang ...................... | G11C 16/26 |
| 2015/0094875 A1* | 4/2015 | Duzly ................. | G06F 13/1668 700/300 |
| 2019/0339755 A1* | 11/2019 | Chai ....................... | G06F 1/305 |
| 2022/0121985 A1* | 4/2022 | Lloyd .................. | G06F 3/0604 |

FOREIGN PATENT DOCUMENTS

| | | |
|---|---|---|
| CN | 101960418 | 4/2013 |
| CN | 108604456 | 9/2018 |
| TW | 201419300 | 5/2014 |
| TW | I522794 | 2/2016 |
| TW | 201802694 | 1/2018 |
| TW | I648634 | 1/2019 |
| TW | 201933097 | 8/2019 |
| TW | 201941057 | 10/2019 |
| TW | 202125206 | 7/2021 |

* cited by examiner

*Primary Examiner* — Than Nguyen
(74) *Attorney, Agent, or Firm* — JCIPRNET

(57) ABSTRACT

A memory control method and a memory storage system are provided. The method includes: in a memory closing procedure, sending, by a host system, a first control command to a memory storage device which includes a volatile memory module and a rewritable non-volatile memory module; closing, by the memory storage device, the volatile memory module in response to the first control command; and in a state where the volatile memory module is closed, maintaining, by the memory storage device, the rewritable non-volatile memory module to be operated normally.

18 Claims, 3 Drawing Sheets

SYSTEM AND METHOD TO CONTROL TEMPERATURE IN A MEMORY DEVICE

CROSS-REFERENCE TO RELATED APPLICATION

This application claims the priority benefit of Taiwan application serial no. 111102240, filed on Jan. 19, 2022. The entirety of the above-mentioned patent application is hereby incorporated by reference herein and made a part of this specification.

BACKGROUND

Technical Field

The disclosure relates to a memory control technology, and in particular, to a memory control method and a memory storage system.

Description of Related Art

Generally, a temperature control mechanism is equipped in a memory device or other types of electronic devices. When the temperature inside the device is too high, the temperature control mechanism is activated for cooling. However, heating of volatile memory in the device is usually not considered when most memory devices perform a cooling operation, and the device cooling efficiency is thus compromised.

SUMMARY

The disclosure is directed to a memory control method and a memory storage system capable of increasing the cooling efficiency of a memory storage device by closing voltage memory in the memory storage device.

The embodiment of the disclosure provides a memory control method for a memory storage system. The memory storage system includes a host system and a memory storage device. The memory control method includes the following. In a memory closing procedure, the host system sends a first control command to the memory storage device. The memory storage device includes a volatile memory module and a rewritable non-volatile memory module. In response to the first control command, the memory storage device closes the volatile memory module. In a state where the volatile memory module is closed, the memory storage device maintains the rewritable non-volatile memory module to be operated normally.

The embodiment of the disclosure further provides a memory storage system including a host system and a memory storage device. The memory storage device is coupled to the host system. The memory storage device includes a volatile memory module and a rewritable non-volatile memory module. In a memory closing procedure, the host system is configured send a first control command to the memory storage device. In response to the first control command, the memory storage device is configured to close the volatile memory module. In a state where the volatile memory module is closed, the memory storage device is further configured to maintain the rewritable non-volatile memory module to be operated normally. Based on the above, in the memory closing procedure, the host system may send the first control command to the memory storage device including both of the volatile memory module and the rewritable non-volatile memory module at the same time to instruct the memory storage device to close the internal volatile memory module. At the same time, in the state where the volatile memory module is closed, the memory storage device may still maintain the rewritable non-volatile memory module to be operated normally. Accordingly, in a state where the rewritable non-volatile memory module is operated normally, the cooling efficiency of the memory storage device may be increased.

DESCRIPTION OF THE EMBODIMENTS

Figure 1:
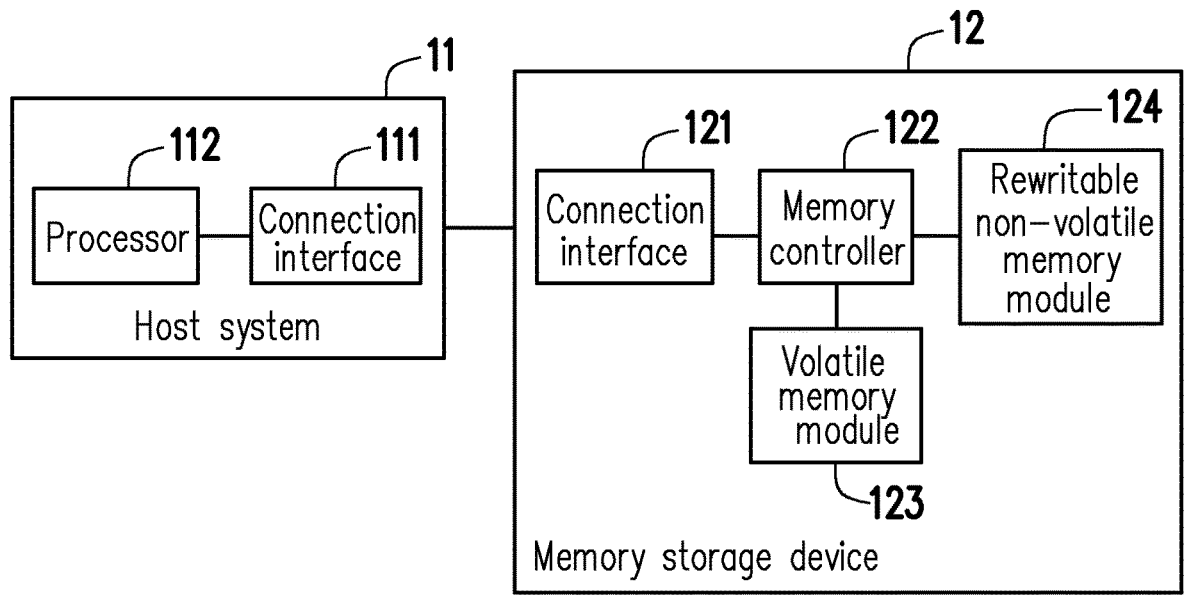
FIG. 1 is a schematic diagram of a memory storage system according to an embodiment of the disclosure.

FIG. 1 is a schematic diagram of a memory storage system according to an embodiment of the disclosure. Referring to FIG. 1, a memory storage system 10 includes a host system 11 and a memory storage device 12. The host system 11 may store data in the memory storage device 12 or access the data from the memory storage device 12. The host system 11 may be any system capable of storing the data with the memory storage device 12, such as a computer system. The host system 11 may be implemented in various electronic devices such as a smartphone, a tablet computer, a laptop, a desk computer, an industrial PC, a game console, or a camera. The memory storage device 12 may be various non-volatile memory storage devices, such as a flash drive, a memory card, a solid state drive (SSD), a secure digital (SD) card, a compact flash (CF) card, and the like.

The host system 11 may include a connection interface 111 and a processor 112. The connection interface 111 is configured to couple the host system 11 to the memory storage device 12. The host system 11 may communicate with the memory storage device 12 through the connection interface 111. For example, the connection interface 111 may transmit the data to the memory storage device 12 or receive the data from the memory storage device 12.

The processor 112 is coupled to the connection interface 111. The processor 112 may be in charge of entire or a part of operation of the host system 11. For example, the processor 112 may include a central processing unit (CPU), or other programmable general-purpose or special-purpose microprocessor, a digital signal processor (DSP), a programmable controller, an application specific integrated circuit (ASIC), a programmable logic device (PLD), other similar devices, or a combination of the above devices.

In an embodiment, the host system 11 may further include any hardware device required for actual implementation, such as memory, a battery unit, a network interface card, a keyboard (or a touch panel), a screen, and/or a speaker. In addition, in the embodiments below, a description of the processor 112 may be the same as a description of the host system 11.

The memory storage device 12 includes a connection interface 121, a memory controller 122, a volatile memory module 123, and a rewritable non-volatile memory module 124. The connection interface 121 is configured to couple the memory storage device 12 to the host system 11. For example, the memory storage device 12 may communicate with the host system 11 through the connection interface 112. For example, the connection interface 111 and the connection interface 121 may meet various connection interface standards, such as a serial advanced technology attachment (SATA), a parallel advanced technology attachment (PATA), a peripheral component interconnect express (PCI Express), or a universal serial bus (USB). In an embodiment, the connection interface 111 and the connection interface 121 meet the NVM Express (NVMe) specification.

The memory controller 122 is coupled to the connection interface 121, the volatile memory module 123, and the rewritable non-volatile memory module 124. The memory controller 122 is configured to control entire or a part of operation of the memory storage device 12. In addition, the memory controller 122 may write, read, and delete the data in the rewritable non-volatile memory module 124 according to a command of the host system 11. In an embodiment, the memory controller 122 may include a flash memory controller.

The volatile memory module 123 is configured to store the data temporarily. For example, the volatile memory module 123 may include dynamic random access memory (DRAM). The volatile memory module 123 may lose the data when power is turned off.

The rewritable non-volatile memory module 124 is configured to store data written by the host system 11. For example, the rewritable non-volatile memory module 124 may include various flash memory modules. A memory cell in the rewritable non-volatile memory module 124 stores the data through a change in a critical voltage. In addition, the rewritable non-volatile memory module 124 may still store the data when the power is turned off.

In an embodiment, a data accessing speed of the volatile memory module 123 is greater than a data accessing speed of the rewritable non-volatile memory module 124. In addition, in the embodiments below, a description of the memory controller 122 may be the same as a description of the memory storage device 12.

In an embodiment, the processor 112 may activate a memory closing procedure. In the memory closing procedure, the processor 112 may instruct the memory storage device 12 to close the volatile memory module 123. Note that after the volatile memory module 123 is closed, the memory storage device 12 and the rewritable non-volatile memory module 124 may still be operated normally. In this way, the processor 112 may cool the memory storage device 12 by executing the memory closing procedure.

Figure 2:
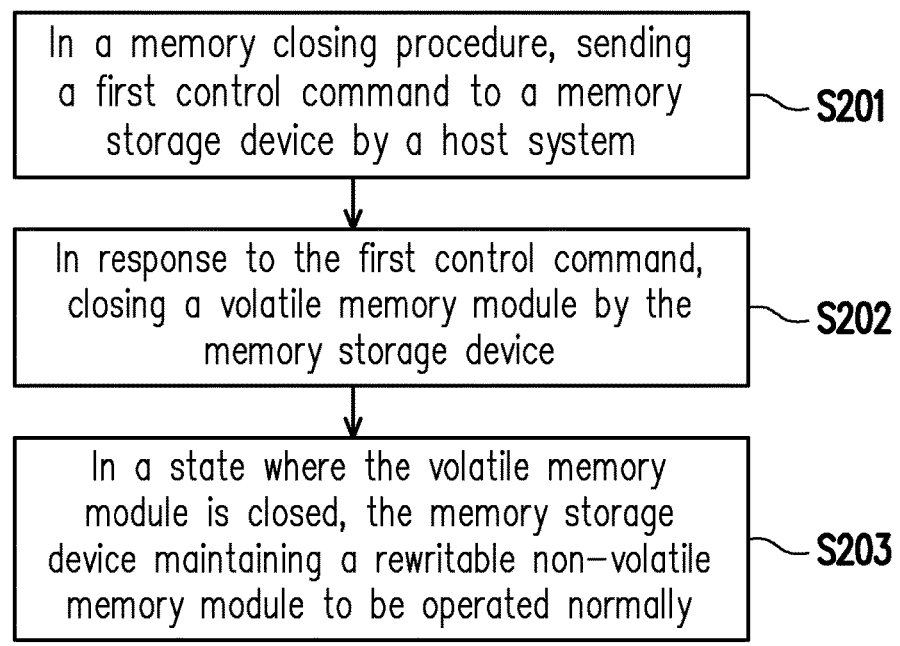
FIG. 2 to FIG. 5 are flowcharts of a memory control method according to an embodiment of the disclosure.

FIG. 2 is a flowchart of a memory control method according to an embodiment of the disclosure Referring to FIG. 1 and FIG. 2, in step S201, in the memory closing procedure, the host system 11 may send a control command (also referred to as a first control command) to the memory storage device 12. For example, the processor 112 may transmit the first control command to the memory storage device 12 through the connection interface 111. For example, the first control command may include a developer command. The first control command may instruct the memory storage device 12 to close the volatile memory module 123.

In step S202, in response to the first control command, the memory storage device 12 closes the volatile memory module 123. For example, the memory controller 122 may receive the first control command through the connection interface 121. In response to the first control command, the memory controller 122 may turn off power supplied to the volatile memory module 123 by the memory storage device 12 to close the volatile memory module 123.

In step S203, in a state where the volatile memory module 123 is closed, the memory storage device 12 may maintain the rewritable non-volatile memory module 124 to be operated normally. For example, after stopping supplying the power to the volatile memory module 123, the memory controller 122 may still continue accessing the rewritable non-volatile memory module 124 to write, read, and/or delete the data for the rewritable non-volatile memory module 124.

Note that in the state where the volatile memory module 123 is closed, a heating amount per time unit of the memory storage device 12 may be reduced. Hence, by closing the volatile memory module 123, it is helpful for cooling the memory storage device 12 and/or increasing the cooling efficiency of the memory storage device 12.

In an embodiment, after receiving the first control command and before closing the volatile memory module 123, the memory controller 122 may copy a part of the data (also referred to as first data) in the volatile memory module 123 to the rewritable non-volatile memory module 124 for storage. At the same time, the memory controller 122 may copy another part of the data (also referred to as second data) in the volatile memory module 123 to the memory controller 122 for storage. In this way, even if the volatile memory module 123 is closed (e.g. the power is turned off), the data originally temporarily stored in the volatile memory module 123 may still be kept (i.e. making a backup).

In an embodiment, the first data may include logical-to-physical mapping information configured to describe a mapping relationship between a logical unit and a physical unit. The logical unit may be configured to be mapped to the physical unit. The physical unit may include various physical management units including multiple memory cells in the rewritable non-volatile memory module 124, such as a physical fan, a physical page, or a physical block. For example, the one logical unit may correspond to one logical block address (LBA), and the one physical unit may correspond to one physical block address (PBA). The memory controller 122 may access the physical unit in the rewritable non-volatile memory module 124 according to the logical-to-physical mapping information. In this way, after backing up the first data to the rewritable non-volatile memory module 124, the memory controller 122 may still perform a data accessing operation according to the first data in the rewritable non-volatile memory module 124.

In an embodiment, the second data may include a firmware code configured to control the memory storage device 12. For example, the second data may be copied to static random access memory (SRAM) in the memory controller 122. In this way, after backing up the second data to the memory controller 122, the memory controller 122 may still continue operating the second data to control the memory storage device 12, such as accessing the rewritable non-volatile memory module 124.

In an embodiment, by backing up the data (e.g. the first data and the second data) in the volatile memory module 123 in advance, after the power of the volatile memory module 123 is turned off, the memory storage device 12 (including the memory controller 122 and the rewritable non-volatile memory module 124) may still be operated normally. In addition, after the power supply of the volatile memory module 123 is recovered, backup data (e.g. the first data and the second data) may be stored back to the volatile memory module 123 to recover operation efficiency of the memory storage device 12.

In an embodiment, the processor 112 may determine whether to activate the memory closing procedure according to whether a temperature of the memory storage device 12 is greater than a predetermined value and/or whether the memory storage device 12 activates a cooling procedure. For example, in a state where the temperature of the memory storage device 12 is greater than the predetermined value and/or the memory storage device 12 activates the cooling procedure, the processor 112 may activate the memory closing procedure. In a state where the temperature of the memory storage device 12 is not greater than the predetermined value and the memory storage device 12 does not activate the cooling procedure, the processor 112 may not activate the memory closing procedure. Note that the processor 112 may also activate the memory closing procedure according to other conditions based on actual requirements.

Figure 3:
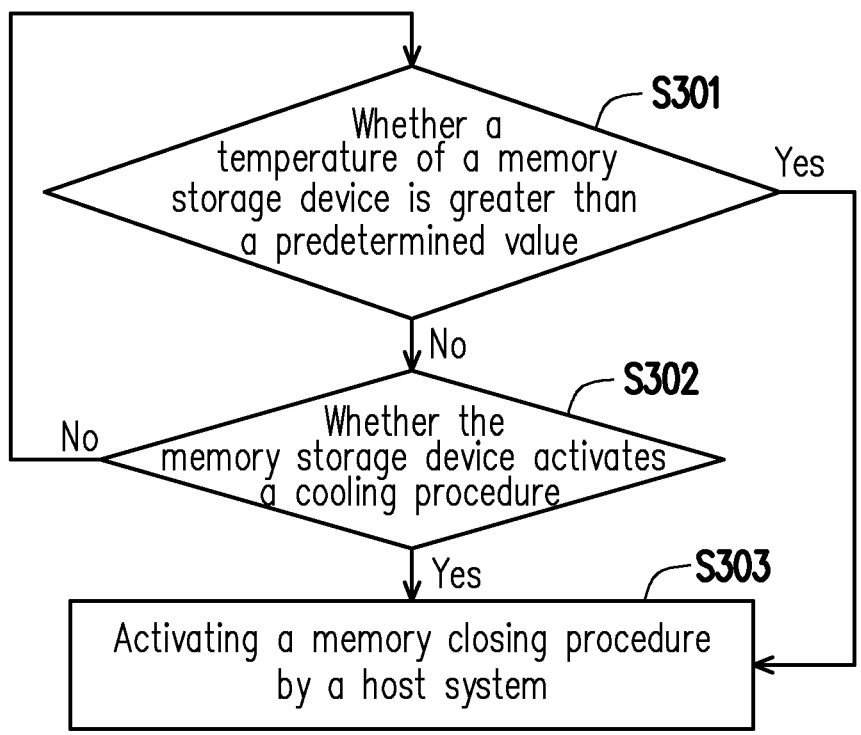

FIG. 3 is a flowchart of a memory control method according to an embodiment of the disclosure Referring to FIG. 1 and FIG. 3, in step S301, the host system 11 (i.e. the processor 112) may determine whether the temperature of the memory storage device 12 is greater than the predetermined value. If the temperature of the memory storage device 12 is greater than the predetermined value, in step S303, the processor 112 may activate the memory closing procedure. If the temperature of the memory storage device 12 is not greater than the predetermined value, in step S302, the processor 112 may determine whether the memory storage device 12 activates the cooling procedure. If the memory storage device 12 activates the cooling procedure, in step S303, the processor 112 may activate the memory closing procedure. In addition, if the temperature of the memory storage device 12 is not greater than the predetermined value and the memory storage device 12 does not activate the cooling procedure, the process returns to step S301.

In an embodiment, before executing the memory closing procedure, the processor 112 may transmit a query command to the memory storage device 12 to query whether the memory storage device 12 supports the memory closing procedure. If the memory storage device 12 supports the memory closing procedure, the processor 112 may subsequently activate and execute the memory closing procedure. If the memory storage device 12 does not support the memory closing procedure, the processor 112 may not execute the memory closing procedure.

Figure 4:
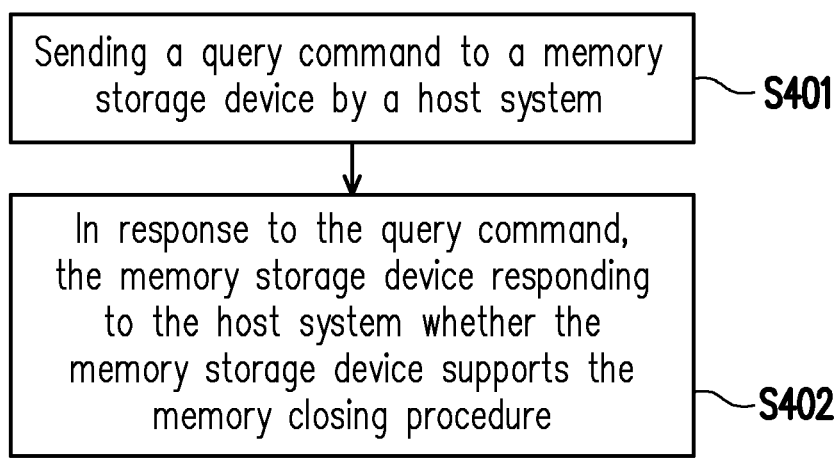

FIG. 4 is a flowchart of a memory control method according to an embodiment of the disclosure. Referring to FIG. 1 and FIG. 4, in step S401, before executing the memory closing procedure, the host system 11 (i.e. the processor 112) may send a query command to the memory storage device 12. In step S402, in response to the query command, the memory storage device 12 may respond to the host system 11 about whether to support the memory closing procedure. For example, the memory controller 122 may query a setting table according to the query command. The memory controller 122 may transmit a response to the host system 11 according to information in the setting table. The processor 112 may obtain whether the memory storage device 12 supports the memory closing procedure according to the response.

In an embodiment, after closing the volatile memory module 123, the processor 112 may detect the temperature and/or a busy state of the memory storage device 12 to determine whether to reboot the volatile memory module 123. For example, the processor 112 may determine whether to reboot the volatile memory module 123 according to whether the temperature of the memory storage device 12 is less than the predetermined value and/or whether the memory storage device 12 is not in the busy state. In an embodiment, after closing the volatile memory module 123, the processor 112 may also determine whether to reboot the volatile memory module 123 according to whether the memory storage device 12 finishes the cooling procedure.

Figure 5:
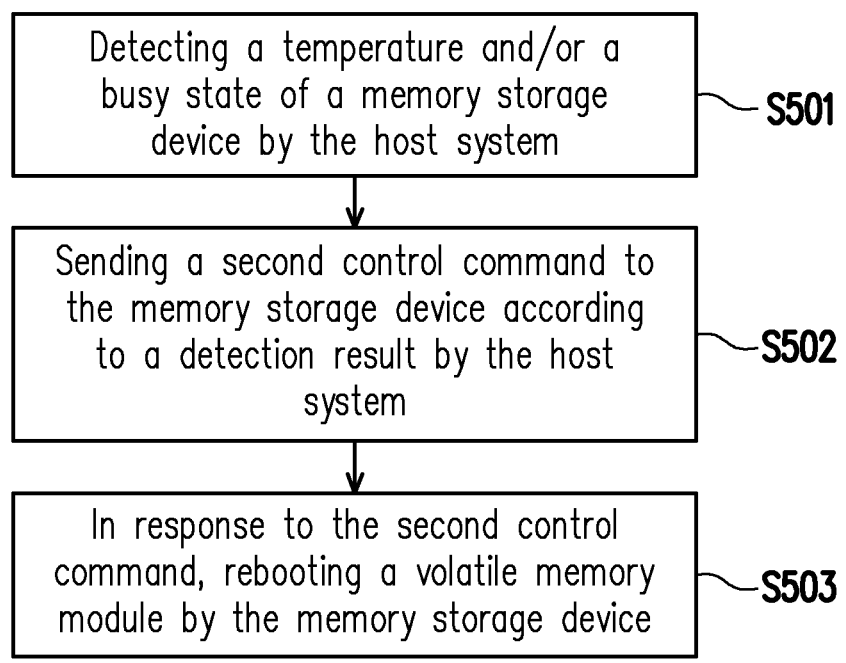

FIG. 5 is a flowchart of a memory control method according to an embodiment of the disclosure. Referring to FIG. 1 and FIG. 5, in step S501, after closing the volatile memory module 123, the host system 11 (i.e. the processor 112) may detect the temperature and/or the busy state of the memory storage device 12. In step S502, the processor 112 may send another control command (also referred to as a second control command) to the memory storage device 12 according to a detection result. In step S503, in response to the second control command, the memory storage device 12 may reboot the volatile memory module 123, such as recovering the power supplied to the volatile memory module 123.

In an embodiment, in response to the temperature of the memory storage device 12 being less than the predetermined value and/or the memory storage device 12 not being in the busy state, the processor 112 may send the second control command to instruct the memory storage device 12 to reboot the volatile memory module 123. In an embodiment, in response to the memory storage device 12 finishing the previously executed cooling procedure, the processor 112 may send the second control command to instruct the memory storage device 12 to reboot the volatile memory module 123.

In an embodiment, in the state where the volatile memory module 123 is closed, the memory controller 122 may simultaneously execute the cooling procedure to try to lower the temperature of the memory storage device 12. For example, the cooling procedure may include various operation means for cooling, such as lowering a clock rate, a transmission bandwidth, and/or power supply voltage of the memory storage device 12. In particular, in the state of executing the cooling procedure, data accessing performance of the memory storage device 12 may be reduced. Hence, even if the volatile memory module 123 is closed, a user may not clearly feel reduced system performance due to closing the volatile memory module 123.

In an embodiment, after closing the volatile memory module 123, the processor 112 may provide internal memory storage space of the host system 11 for the memory storage device 12 to use to enhance working efficiency of the memory storage device 12. For example, the processor 112 may set a part of the internal memory storage space of the host system 11 as a host memory buffer (HMB) area to replace the closed volatile memory module 123 in the memory storage device 12. In the state where the volatile memory module 123 is closed, the memory controller 122 may access the host memory buffer. For example, the data may be stored temporarily in the host memory buffer, and the data may be accessed from the host memory buffer area.

However, each step of FIG. 2 to FIG. 5 is described in detail above, and relevant details are not repeated. It is worth noting that each step of FIG. 2 to FIG. 5 may be implemented as various program codes or circuits, and the disclosure is not limited thereto. In addition, each step of FIG. 2 to FIG. 5 may be adopted accompanied with the embodiments above or be adopted independently, and the disclosure is not limited thereto.

In summary of the above, in the embodiments of the disclosure, the host system may control the memory storage device to close the internal volatile memory module of the memory storage device to cool the memory storage device. In this way, the cooling efficiency of the memory storage device may be effectively enhanced.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A memory control method for a memory storage system, wherein the memory storage system comprises a host system and a memory storage device, and the memory control method comprises:
   in a memory closing procedure, sending a first control command to the memory storage device by the host system, wherein the memory storage device comprises a volatile memory module and a rewritable non-volatile memory module;
   in response to the first control command, closing the volatile memory module by the memory storage device; and
   in a state where the volatile memory module is closed, maintaining the rewritable non-volatile memory module to be operated normally by the memory storage device,
   wherein the method further comprises:
   before executing the memory closing procedure, sending a query command to the memory storage device by the host system; and
   in response to the query command, the memory storage device responding to the host system about whether the memory storage device supports the memory closing procedure.

2. The memory control method according to claim 1, wherein closing the volatile memory module comprises:
   turning off power supplied to the volatile memory module by the memory storage device.

3. The memory control method according to claim 2, wherein closing the volatile memory module further comprises:
   before turning off the power supplied to the volatile memory module by the memory storage device, copying first data in the volatile memory module to the rewritable non-volatile memory module, and copying second data in the volatile memory module to a memory controller of the memory storage device.

4. The memory control method according to claim 3, wherein the first data comprises logical-to-physical mapping information configured to describe a mapping relationship between a logical unit and a physical unit, and the second data comprises a firmware code configured to control the memory storage device.

5. The memory control method according to claim 1, the method further comprising:
   in response to a temperature of the memory storage device being greater than a predetermined value or the memory storage device activating a cooling procedure, activating the memory closing procedure by the host system to cool the memory storage device.

6. The memory control method according to claim 1, the method further comprising:
   after closing the volatile memory module, detecting at least one of a temperature and a busy state of the memory storage device by the host system;
   sending a second control command to the memory storage device according to a detection result by the host system; and
   in response to the second control command, rebooting the volatile memory module by the memory storage device.

7. The memory control method according to claim 6, wherein sending the second control command to the memory storage device according to the detection result by the host system comprises:
   in response to the temperature of the memory storage device being less than a predetermined value or the memory storage device not in the busy state, sending the second control command to the memory storage device.

8. The memory control method according to claim 1, the method further comprising:
   after closing the volatile memory module, determining whether to reboot the volatile memory module according to whether the memory storage device finishes a cooling procedure.

9. The memory control method according to claim 1, the method further comprising:
   after closing the volatile memory module, providing internal memory storage space of the host system by the host system for the memory storage device to use.

10. A memory storage system, comprising:
    a host system; and
    a memory storage device coupled to the host system,
    wherein the memory storage device comprises a volatile memory module and a rewritable non-volatile memory module,
    in a memory closing procedure, the host system is configured to send a first control command to the memory storage device,
    in response to the first control command, the memory storage device is configured to close the volatile memory module; and
    in a state where the volatile memory module is closed, the memory storage device is further configured to maintain the rewritable non-volatile memory module to be operated normally,
    wherein, before executing the memory closing procedure, the host system is further configured to send a query command to the memory storage device; and
    in response to the query command, the memory storage device is further configured to respond to the host system about whether the memory storage device supports the memory closing procedure.

11. The memory storage system according to claim 1, wherein an operation of closing the volatile memory module comprises:
    turning off power supplied to the volatile memory module by the memory storage device.

12. The memory storage system according to claim 11, wherein the operation of closing the volatile memory module further comprises:
    before turning off the power supplied to the volatile memory module by the memory storage device, copying first data in the volatile memory module to the rewritable non-volatile memory module, and copying second data in the volatile memory module to a memory controller of the memory storage device.

13. The memory storage system according to claim 12, wherein the first data comprises logical-to-physical mapping information configured to describe a mapping relationship between a logical unit and a physical unit, and the second data comprises a firmware code configured to control the memory storage device.

14. The memory storage system according to claim 10, wherein, in response to a temperature of the memory storage device being greater than a predetermined value or the memory storage device activating a cooling procedure, the host system is further configured to activate the memory closing procedure to cool the memory storage device.

15. The memory storage system according to claim 10, wherein, after closing the volatile memory module, the host system is further configured to detect at least one of a temperature and a busy state of the memory storage device;
   the host system is further configured to send a second control command to the memory storage device according to a detection result; and
   in response to the second control command, the memory storage device is further configured to reboot the volatile memory module.

16. The memory storage system according to claim 15, wherein an operation of sending the second control command to the memory storage device according to the detection result comprises:
   in response to the temperature of the memory storage device being less than a predetermined value or the memory storage device not in the busy state, sending the second control command to the memory storage device.

17. The memory storage system according to claim 10, wherein, after closing the volatile memory module, the host system is further configured to determine whether to reboot the volatile memory module according to whether the memory storage device finishes a cooling procedure.

18. The memory storage system according to claim 10, wherein, after closing the volatile memory module, the host system is further configured to provide internal memory storage space of the host system for the memory storage device to use.

\* \* \* \* \*